United States Patent [19]
Wernig

[11] Patent Number: 5,861,815
[45] Date of Patent: Jan. 19, 1999

[54] LIGHT BAR AND REFLECTOR ASSEMBLY

[75] Inventor: Glenn Alan Wernig, San Jose, Calif.

[73] Assignee: Silicon Graphics, Inc., Mountain View, Calif.

[21] Appl. No.: 794,198

[22] Filed: Jan. 24, 1997

[51] Int. Cl.$^6$ .................................................. G08B 5/36
[52] U.S. Cl. .............................. 340/815.75; 340/815.4; 340/691; 362/26
[58] Field of Search ........................... 340/815.4, 815.69, 340/815.73, 815.75, 815.76, 691, 535; 362/26, 31, 85; 361/683; 359/599, 838, 850, 856, 857

[56] References Cited

U.S. PATENT DOCUMENTS

| | | | |
|---|---|---|---|
| 5,008,655 | 4/1991 | Schlesinger et al. | 340/691 |
| 5,268,823 | 12/1993 | Yergenson | 362/32 |
| 5,515,244 | 5/1996 | Levins et al. | 362/26 |

*Primary Examiner*—Jeffery A. Hofsass
*Assistant Examiner*—Anh La
*Attorney, Agent, or Firm*—Wagner, Murabito & Hao

[57] ABSTRACT

A light bar and reflector assembly for indicating the status of a computing device is disclosed. A reflector assembly having a light source is connected to the chassis of a computer. The reflector assembly includes reflective surfaces that reflect light from the light source through an opening in the reflector assembly. A light bar is attached to the bezel such that, when the bezel is placed over the computer chassis, the light bar aligns with the opening in the reflector assembly. The light bar includes reflective surfaces so as to channel the light from the light source to refractive surfaces which refract the light into the air such that a distinctive light pattern is visible across the length of the light bar. The design of the light bar produces an intense broad band of visible light on the light bar. The light intensity dissipates towards each end of the light bar. A colored light source located within the reflector assembly may be engaged so as to produce a colored band of visible light on the light bar.

20 Claims, 13 Drawing Sheets

LIGHT BAR AND REFLECTOR ASSEMBLY

TECHNICAL FIELD

The present claimed invention relates to the field of condition indicators for electronic devices. More specifically, the present claimed invention relates to an improved condition indicator for computing devices.

BACKGROUND ART

Prior art methods for indicating status of a computer typically involve the use of lamps which radiate light through a lens cover of some type. Typically, different colors of material are used as lens covers so as to produce light output having a specific color so as to indicate a specific condition. For example, a light which has a clear or a slightly opaque cover may be used to produce a white light so as to indicate that the computer is on. Another example is the use of a second light which is typically located near the first light and which is covered with a red lens cover so as to produce a red light. The red light could be used to indicate an error condition.

These prior art indicators are difficult to see as a result of the emanation of the light directly from a "point" light source. In order for a user to see the light, he must be looking at the extremely small area from which the light radiates. Though the lens cover may partially dissipate the light so as to increase the area that is visibly lighted, the area is still very small.

In an attempt to make condition indicators more visible, cylindrical lens covers have been used. These cylindrical lens covers project out of the computer housing. By using a cylindrical lens cover that projects out from the housing and by moving the bulb outside of the computer housing, the light source is not shielded behind the housing. Thus, a brighter and more visible indication results. However, the light still emanates from a "point" source such that the area of visible light is small. Though the light is dissipated by the lens cover so as to illuminate the lens cover, the area of the lens cover is small, resulting in the viewable lighted area being small and difficult to see.

In an attempt to make indicators easier to see, brighter light sources have been used. Condition indicators which use bright lights are easier to see than condition indicators with light sources which are not as bright. However, since the lens covers are small, the brighter light source simply makes the small surface of the lens cover more easily viewable. Thus, the use of a brighter light source does not solve the problems associated with prior art "point" source indicators and the light indicator itself is still difficult for the viewer to see.

More recently, light emitting diodes (LEDs) have been widely used to indicate conditions of computing devices. LEDs are desirable in many applications because they have a very low power consumption rate. However, LEDs do not emit much light. Lens covers which are typically used to enclose the LED typically further decrease the visibility of the indicator since they block some of the light emanating from the LED. Therefore, the light from condition indicators that use LEDs are even more difficult to see than other prior art condition indicators.

Prior art condition indicators art often particularly difficult if not impossible to see when the computer is located in a well lighted area. This is due primarily to the lack of contrast between the indicator and its surroundings. Since computers are often used in well lighted areas, users are often not able to see the status of the computer. Thus, a user may be unaware of a particular condition of the computer. When the condition is an error condition, the users failure to notice the error condition may result in loss of data and incorrect program processing resulting from use of the computer while the error condition is present.

Recent computer designs require that the housing be easily removed from the computer frame or chassis. Thus, prior art condition indicator designs which place the light source on or in the housing are impractical due to the difficulty of disconnecting the wires which supply power to the light source. Though connectors may be used to facilitate connection and disconnection of wiring associated with the indicator assembly, removal and replacement of the computer housing is still slow and time consuming due to the need to disconnect and connect the required connectors. In addition, if a light source is attached to any printed circuit board within a high speed computer, the light source must not violate any electromagnetic interference (EMI) shield for agency code compliance.

Recent computer designs also require that condition indicators minimize power consumption. Because the bright lamps typically used as light sources typically have a high power consumption rate, the need to minimize power consumption has generally led to the use of less powerful light sources. This has led to less visible condition indicators in most prior art designs. In addition to minimizing power consumption, condition indicators must be easy to insert and remove for repair and replacement and must be inexpensive and easy to manufacture. Furthermore, the design of the condition indicator must be such that, when the computer housing is removed so as to expose the condition indicator, the condition indicator is resistant to damage.

What is needed is a condition indicator which is highly visible and which allows the housing to be easily removed from the computer chassis without the need to disconnect wires or connectors. The indicator must indicate multiple conditions and must be inexpensive to manufacture and easy to operate and maintain. Furthermore, a condition indicator which minimizes power consumption and which is easy to insert and remove for repair and replacement is required.

DISCLOSURE OF THE INVENTION

The present invention meets the above needs with a light bar which extends across the front of the computer. A condition indicator generates an intense band of visible white light along the front surfaces of a light bar to indicate that the computer is in the on condition. The condition indicator generates a band of red light along the front surfaces of a light bar so as to indicate an error condition.

A condition indicator which includes a reflector assembly and a light bar is disclosed. The reflector assembly is coupled to a computer which includes a microprocessor, data storage, and a data bus for data input and output. The reflector assembly includes two incandescent lamps and a colored LED which are attached to a small circuit board. The circuit board includes electrical contact pins which engage sockets located on a second circuit board located within the computer chassis so as to provide power for selectively engaging the incandescent lamps and the LED. Light which is emitted by the incandescent lamps and the LED is reflected by the reflective surfaces of the reflector assembly through an opening in the reflector assembly. A textured surface of the light bar directly adjoins the opening in the reflector assembly such that light emitted by the incandescent lamps and the LED pass into the light bar. The textured surface refracts the light so as to spread the light throughout the light bar. The light bar has polished surfaces which reflect the light within the light bar so as to conduct the light towards two refractive surfaces located on the front of the light bar. As the light strikes the two front refractive surfaces it is refracted out of the light bar and into the air, forming a wide band of intense visible light across much of the length of the front refracted surfaces. Since the luminescence of the incandescent lamps is much higher than that of the LED, the band of light produced by engaging the incandescent lamps is broader and more intense than the light produced by the LED. However, both bands of visible light are more intense and more visible than prior art condition indicators.

Because of the dispersal of the light from each light source into wide bands of light, the light emanating from the two end refractive surfaces is easier to see than light from prior art condition indicators. In addition, since the light is concentrated by the reflector assembly and the light bar, the bands of visible light produced by the present invention are brighter than prior art condition indicators, making them easier to see. The visibility of the wide bands of bright visible light emanating from the light bar as disclosed in the present invention is particularly useful when the computers are viewed in highly lighted environments since the wide bands of light are easily observed.

Though the red light source is described as being produced by a LED, incandescent lamps in conjunction with some type of colored film or covering could also be used to produce the colored light. However, the particular light source to be used would depend on the power consumption allocated to the condition indicator versus the need to produce a wide, highly visible band of light. For example, in the present invention, though LEDs produce directional and narrow light emissions, by reflecting the light produced by the LED within the reflector assembly and as a result of the light dispersion caused by the textured light bar surfaces, a broader band of colored light is produced. The band of light typically produced by a single LED is over and inch in length. However, the length of a band of light produced using two incandescent lamps is approximately 8.94 inches and the intensity is much greater than that resulting from the LED source. The length of the bar of light emitted by the light bar can be controlled by the amount of power given to the lamps. The reflector assembly can accommodate up to three lamps for a super bright effect as desired.

Another advantage of the present invention is the fact that no hot spots or pin points of light are created within the light bar in spite of the fact that multiple light sources are used. This is due to the combination of light reflection and refraction of the present invention.

Another advantage of the present invention is the fact that the light bar and the reflector assembly are inexpensive to manufacture and assemble. The light bar and the top enclosure and the bottom enclosure of the reflector assembly are injection molded plastic. The design of the reflector assembly allows for easy assembly due to it's design which includes four "wings" which include finger grips and snaps which engage openings in the computer chassis for easy installation and removal. The number of components is minimized by placing the light sources on a circuit board which is secured between the top enclosure and the bottom enclosure of the reflector assembly. By using the plastic surfaces of the top enclosure of the reflector assembly to insulate pins which connect the circuit board to the internal circuitry of the computer through the EMI shield, the number of components is further minimized since separate connectors and wires are not required in order to make contact with the internal circuitry of the computer. In addition, by incorporating snaps into the design of the light bar, attachment hardware is not required and the light bar easily attaches to the housing of the computer.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
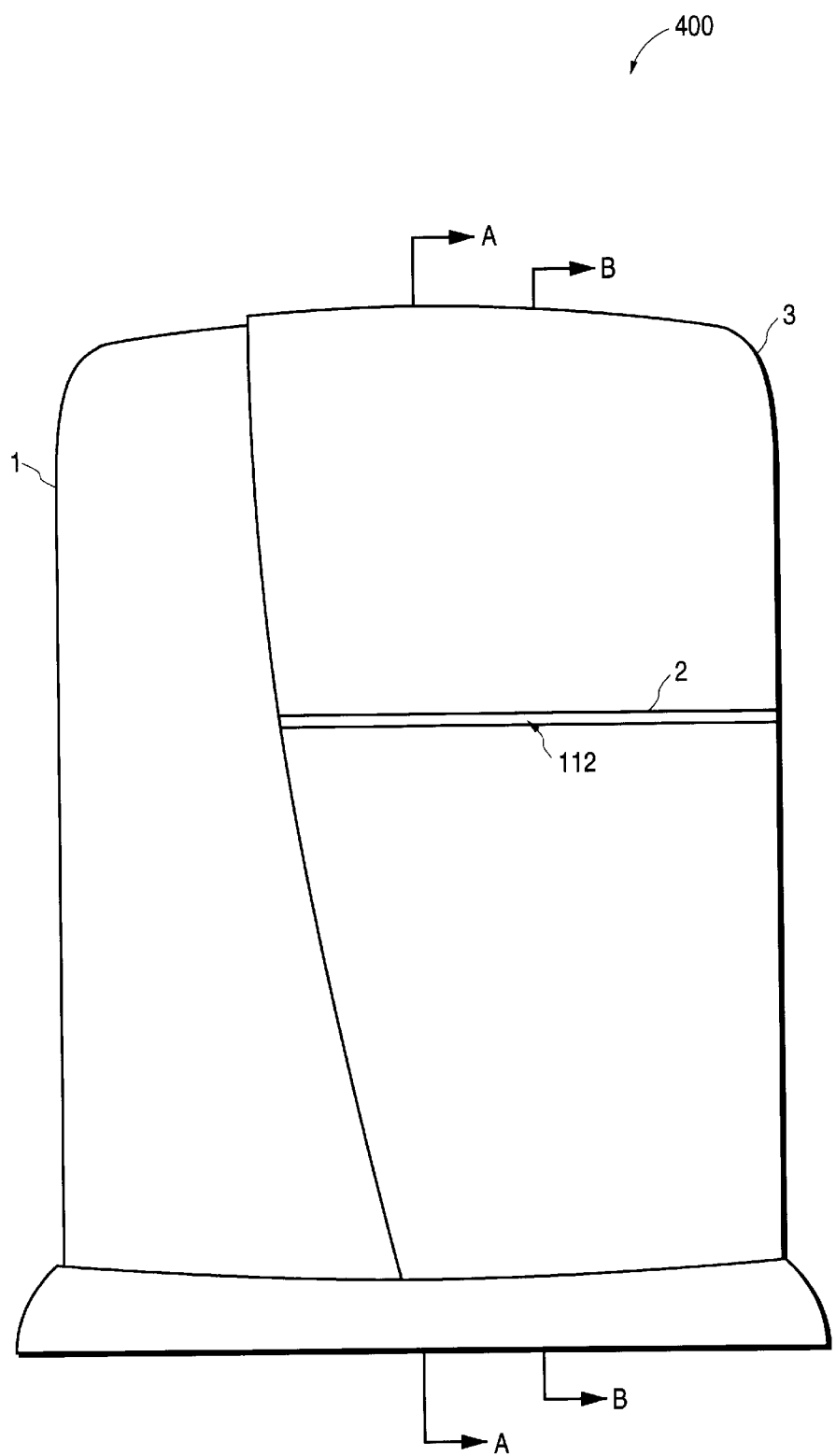
FIG. 1 is a front view illustrating a computer including a light bar in accordance with the present invention.

With reference now to FIG. 1, computer 400 is shown to include a housing which includes bezel 1 and door 3. Bezel 1 encloses the electronic components of computer 400. Door 3 is attached to bezel 1 so that it may be opened so as to provide access the drives of the computer 400. Light bar 2 is located below door 3 and is secured to bezel 1. Light bar 2 emits an intense white light along a wide band so as to indicate the "on" condition of the computer. The light band includes regions of decreasing light intensity on each side of the region of intense light. A band of red light is used to indicate an "error" condition.

Figure 2:
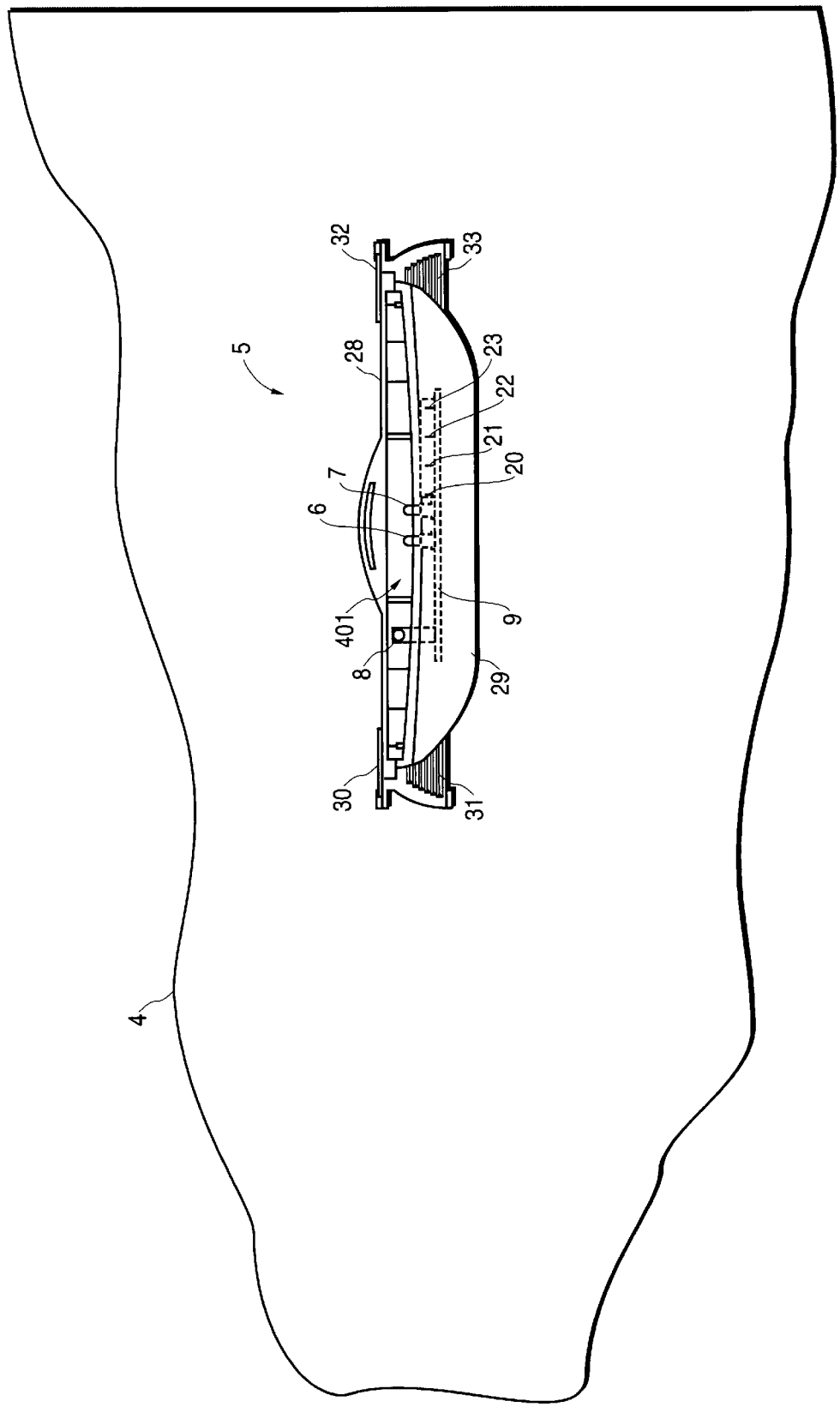
FIG. 2 is a front view illustrating a reflector assembly attached to a computer chassis in accordance with the present invention.

FIG. 2 shows chassis 4 which encloses the electronic components of computer 400. Chassis 4 is formed from sheet metal so as to form an EMI shield, preventing electromagnetic radiation emissions. Reflector assembly 5 includes top enclosure 28 and bottom enclosure 29. Top enclosure 28 attaches to bottom enclosure 29 so as to define opening 401. Printed circuit board 9 includes pins 20–23 which electrically couple printed circuit board 9 to the electronic components of computer 400. Lamp 6 and lamp 7 are coupled to printed circuit board 9. Lamp 6 and lamp 7 may be engaged at selective voltages to illuminate the reflector assembly with white light. Colored light 8 is also attached to printed circuit board 9 and may be engaged so as to illuminate reflector assembly 5 with colored light to indicate a second condition. A LED which emits a red light is used to provide colored light. Once the housing (not shown) is secured to chassis 4, one side of light bar 2 (not shown) is aligned directly adjoining opening 401 of reflector assembly 5. Thus, light from reflector assembly 5 passes directly into light bar 2 without the need to physically connect light bar 2 to reflector assembly 5. Thus, bezel 1 may be easily removed from chassis 4 without any need to disconnect light bar 2 from reflector assembly 5.

Figure 3:
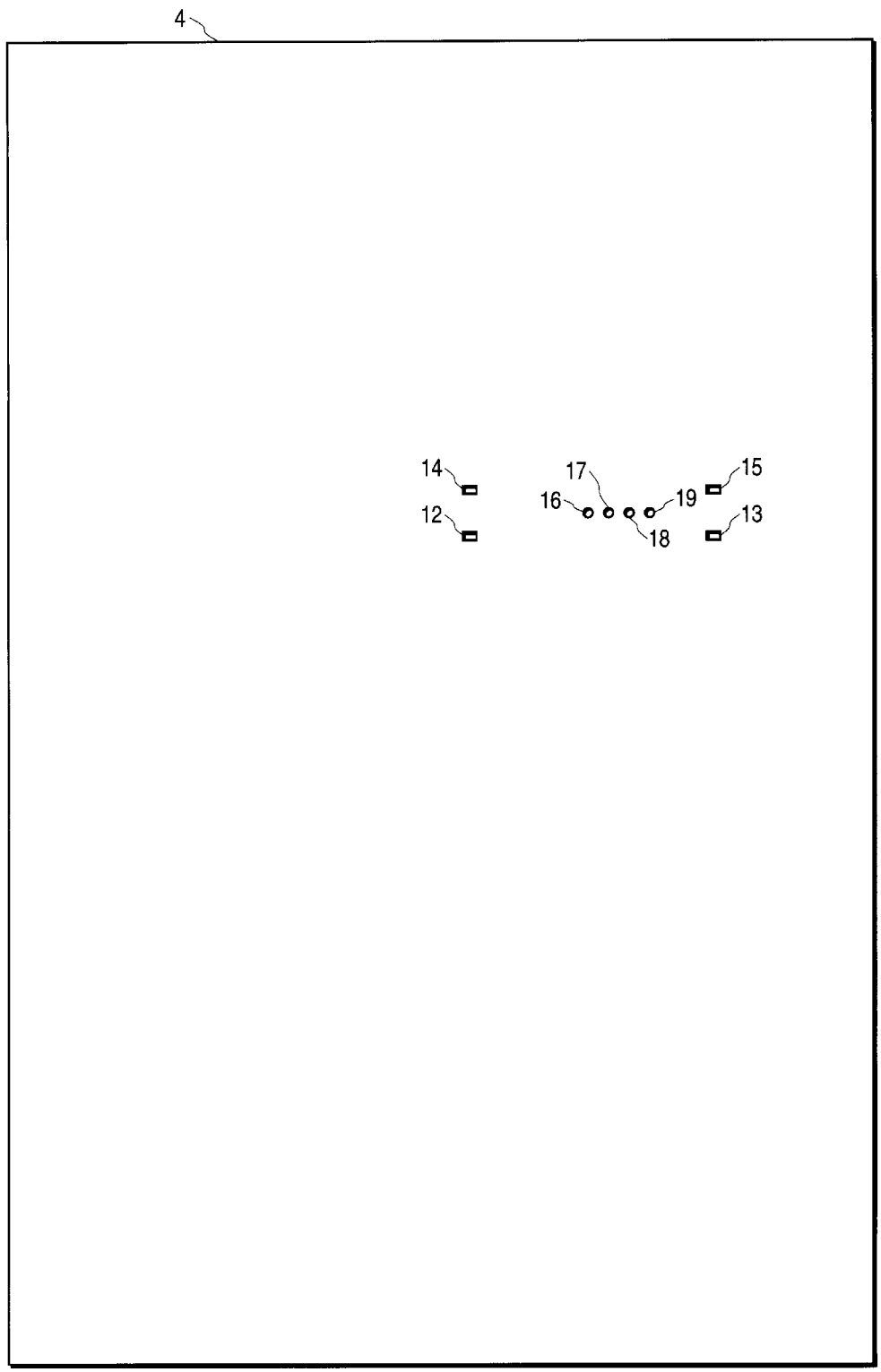
FIG. 3 is a front view illustrating a computer including a chassis in accordance with the present invention.

FIG. 3 shows a front view of computer 400 after the housing, including bezel 1 and light bar 2 and door 3 have been removed. Chassis 4 includes mounting openings 12–15 which engage snaps 24–27 (not shown) for securing reflector assembly 5 (not shown) to chassis 4. Chassis 4 includes openings 16–19 into which pins 20–23 (not shown) are inserted so as to electrically connect reflector assembly 5 with the internal components of computer 400.

Figure 4:
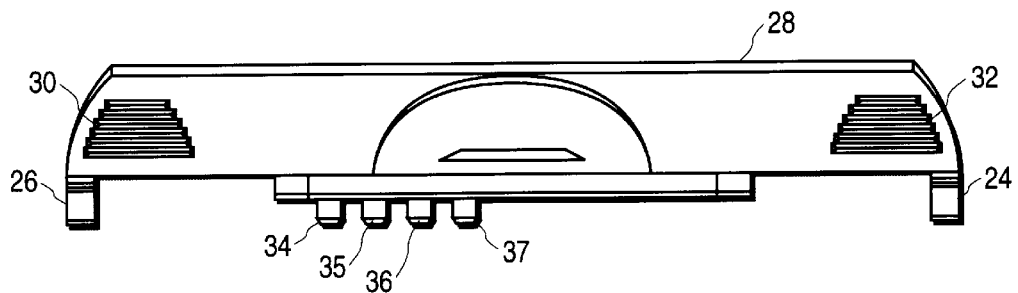
FIG. 4 is a top view illustrating a top enclosure of a reflector assembly in accordance with the present invention.

FIG. 4 illustrates a top view of top enclosure 28. Insulators 34–37 are formed in top enclosure 28 so as to allow pins 20–23 (not shown) to make electrical contact with the internal circuitry of computer 400 without the need for additional parts such as wires or connectors. Snap 24 and snap 26 project from top enclosure 28. Finger grip 30 and finger grip 32 are located near each end of top enclosure 28. Top enclosure 28 is preferably made of light colored plastic such as white colored plastic. Optionally, top enclosure 28 may be plated so as to enhance its reflectivity characteristics.

Figure 5:
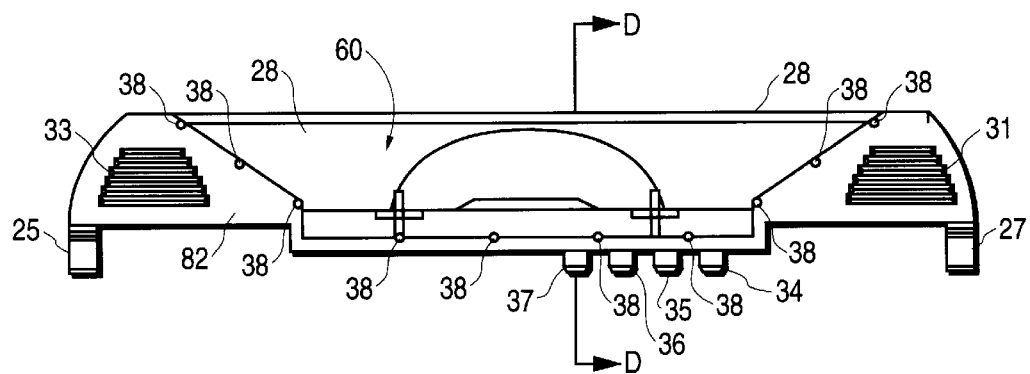
FIG. 5 is a bottom view illustrating a top enclosure of a reflector assembly in accordance with the present invention.

FIG. 5 shows a bottom view of top enclosure 28 (with bottom enclosure 29 not attached). Snap 25 and snap 27 project from top enclosure 28. Finger grip 31 and finger grip 33 are located near each end of top enclosure 28. Mounting pins 38 protrude from the bottom of top enclosure 28 for further assembly of reflector assembly 5. Reflective surface 60 is polished so as to reflect light. Optionally, reflective surface 60 may be plated so as to enhance its reflectivity characteristics.

Figure 6:
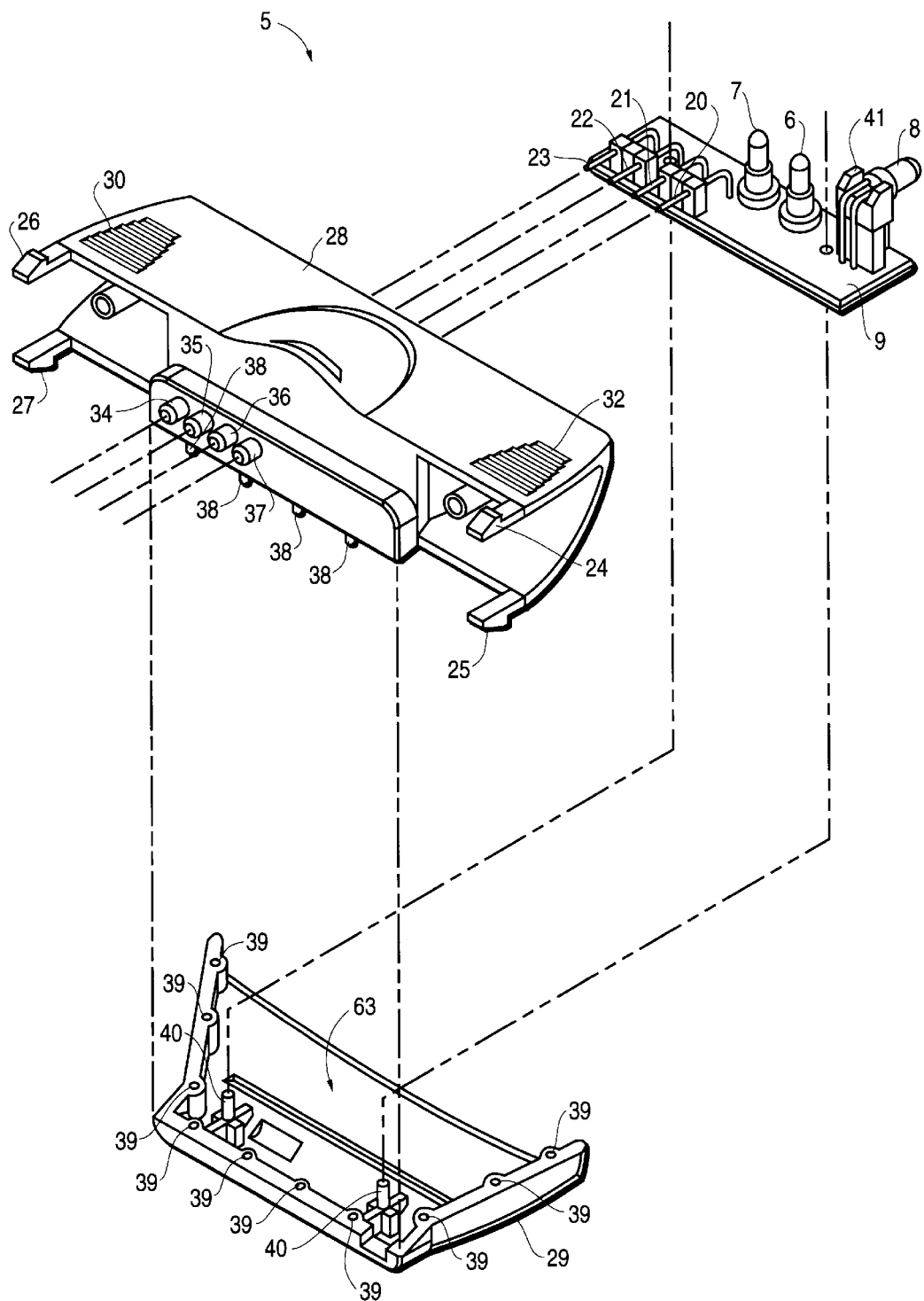
FIG. 6 shows an expanded perspective view of the components of the reflector assembly in accordance with the present invention.

FIG. 6 shows the assembly of top enclosure 28 and bottom enclosure 29 and printed circuit board 9. Pins 20–23 which are attached to circuit board 9 fit within openings in insulators 34–37. Top enclosure 28 is secured to bottom enclosure 29 by mating pins 38 located on top enclosure 28 with openings 39. Bottom enclosure 29 is made of light colored plastic and internal surfaces which are exposed to light such as reflective surface 63 are polished to reflect light. Pins 40 engage openings in printed circuit board 9 so as to securely hold printed circuit board 9 within reflector assembly 5. Lamps 6–7 are secured to printed circuit board 9 and are electrically connected to at least one of pins 20–23. Colored light 8 is secured to printed circuit board 9 and is bent around mounting bracket 41. By using mounting bracket 41 and bending the colored light around mounting bracket 41, a standard sized LED may be used as a colored light. Thus saving the cost of purchasing a custom LED with right angled leads or purchasing a custom LED with leads of a specific length.

Figure 7:
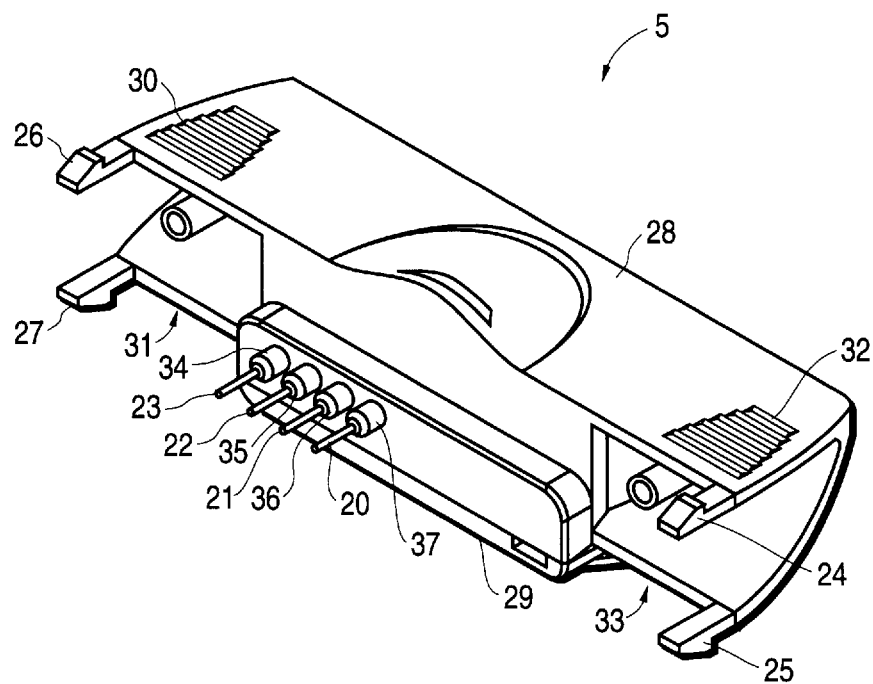
FIG. 7 is a rear perspective view showing a fully assembled reflector assembly in accordance with the present invention.

FIG. 7 shows a isometric view of reflector assembly 5. It can be seen that insulators 34–37 partially cover pins 20–23. This allows for easy coupling of reflector assembly 5 with the internal circuitry of computer 400 and prevents pins 20–23 from grounding out on chassis 4(not shown). Reflector assembly 5 acts as a connector for printed circuit board 9. Each of finger grips 30–33 adjoins one of snaps 24–27 such that applying pressure to finger grips 30–33 will deflect snaps 24–27 so as to easily attach and detach reflector assembly 5 from chassis 4.

Figure 8:
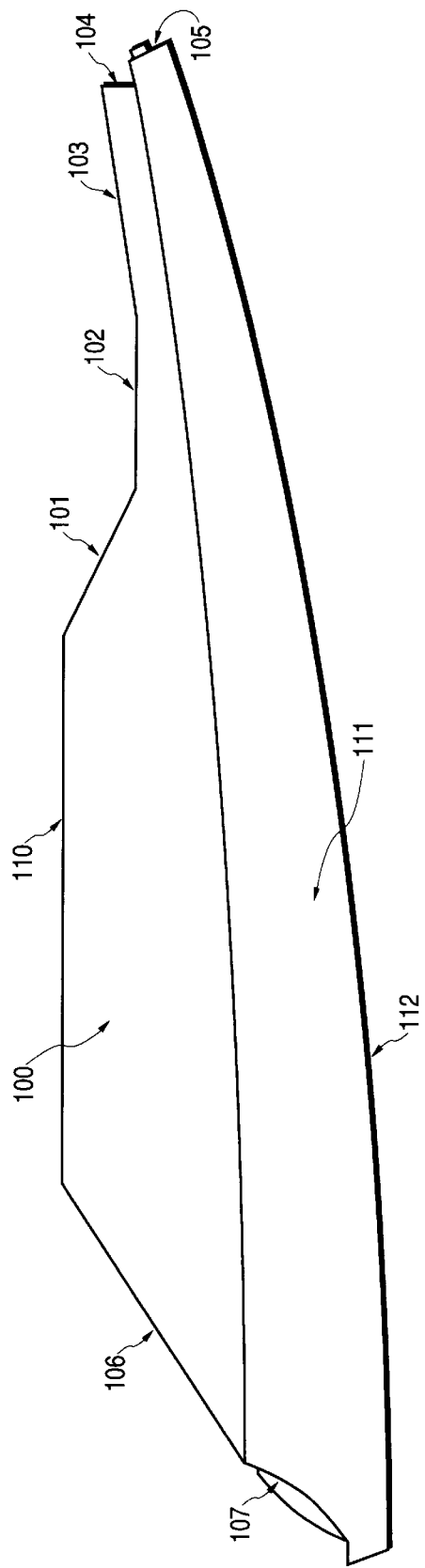
FIG. 8 is a top view showing a light bar in accordance with the present invention.

FIG. 8 shows a top view of light bar 2. Light bar 2 includes reflective surfaces 100–107 and refractive surfaces 110–112. Light enters through refractive surface 110 and passes through the interior of light bar 2, being reflected by reflective surfaces 100–107 and exits through refractive surface 111 and refractive surface 112.

Figure 9:
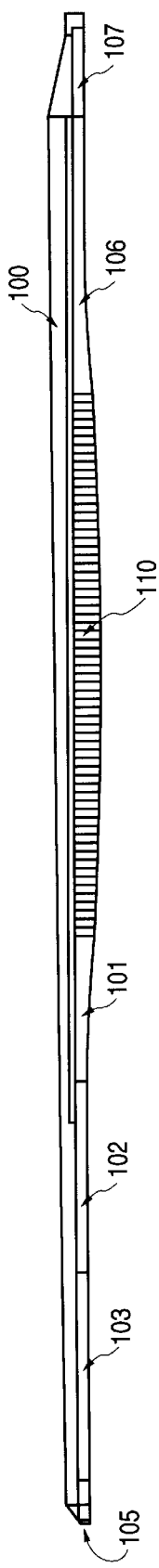
FIG. 9 is a rear view showing a light bar in accordance with the present invention.

FIG. 9 shows a rear view of light bar 2. It can be seen that refractive surface 110 is textured so as to refract light entering into light bar 2. The texture of refractive surface 110 may be formed by machining ridges in the surface of light bar 2. Reflective surfaces 101–103 and 105 and 106 and 107 reflect light towards the front of light bar 2.

Figure 10:
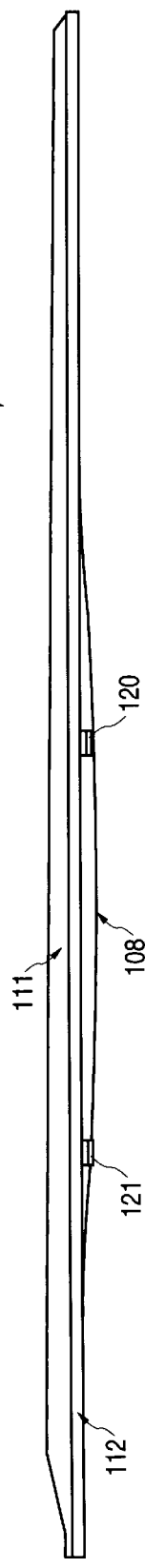
FIG. 10 is a front view showing a light bar in accordance with the present invention.

FIG. 10 shows a front view of light bar 2. Snap 120 and snap 121 secure light bar 2 to bezel 1(not shown). Refractive surface 112 is textured so as to allow the light passing through refractive surface 112 to refract as it passes from light bar 2 into the air. Similarly, refractive surface 111 is textured so as to allow the light passing through refractive surface 111 to refract as it passes from light bar 2 into the air. Lower reflective surface 108 reflects light so as to contain light between reflective surface 100 and reflective surface 108 such that light is channeled to refractive surface 111 and 112.

Figure 11:
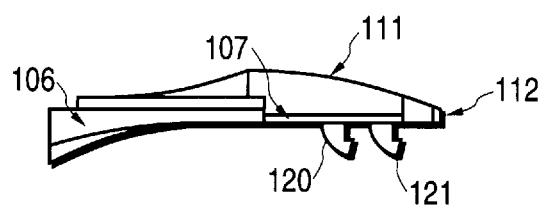
FIG. 11 is a left side view showing a light bar in accordance with the present invention.

FIG. 11 shows a side view of light bar 2. It can be seen that clips 120–121 are shaped so as to fit within slots in bezel l(not shown) so as to secure light bar 2 to bezel 1. Reflective surfaces 106–107 prevent light from escaping through the side of light bar 2 while light exits the light bar through refractive surfaces 111–112. Refractive surface 111 and refractive surface 112 are textured so as to refract light.

Figure 12:
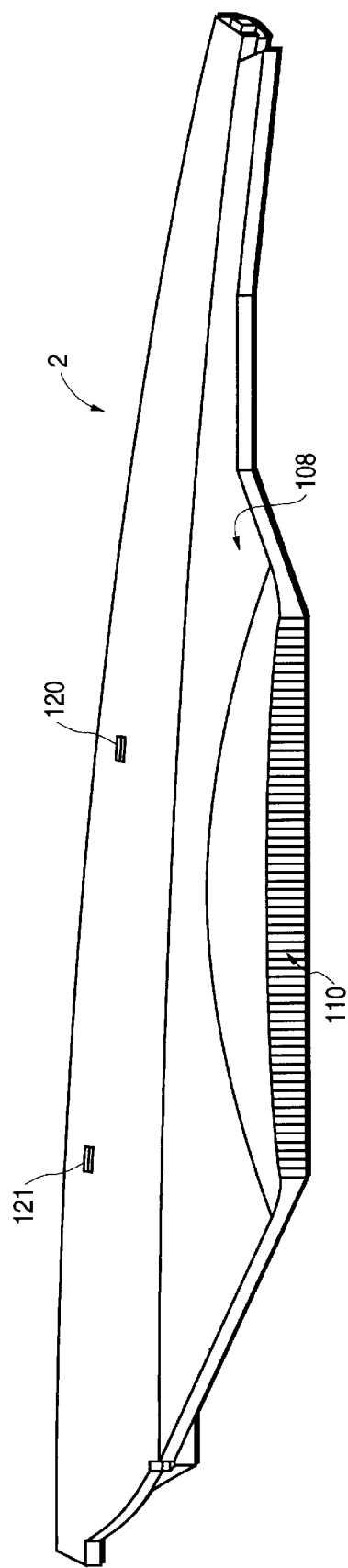
FIG. 12 is a bottom schematic view showing a light bar in accordance with the present invention.

FIG. 12 shows a bottom schematic view of light bar 2. It can be seen how the shape of light bar 2 spreads out light by reflecting and refracting light and channeling light towards refractive surfaces 111–112(not shown).

Figure 13:
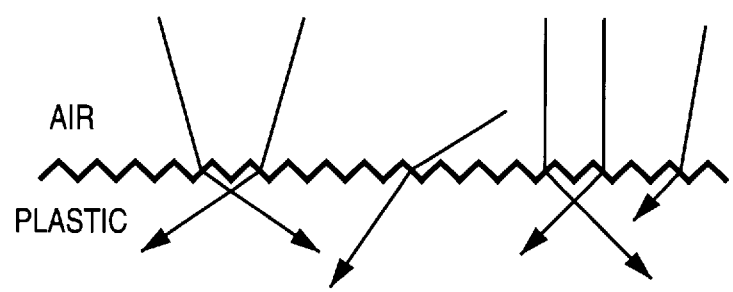
FIG. 13 is a view illustrating rays of light entering a textured surface in accordance with the present invention.

FIG. 13 illustrates how the textured surfaces of refractive surfaces 110 causes light to be dispersed. Any of a number of different types of textured surfaces could be used to refract light passing through the surface. However, in the present embodiment ridges produced by machining the surface of light bar 2 are used to produce the desired refraction so as to form refractive surfaces 110–112. Also affecting the dispersal of light entering and leaving refractive surfaces 110–112 is refraction due to the index of refraction of plastic versus the index of refraction of air. As light passes into plastic it is refracted (bent) towards an axis running perpendicular to the interface. This effect tends to scatter the light passing from air to plastic. This effect combines with the dispersion effect illustrated in FIG. 4 to cause the light to spread in a wide band which has a high intensity light over the length of its surface. The light is further intensified by the reflective surfaces of the light bar, reflecting and concentrating the light down to the narrow refractive surface 112. Though light passing through refractive surface 111 is also reflected off reflective surfaces 100–108, the light is not as concentrated due to the tapering of reflective surfaces 100 and reflective surface 108 such that light is concentrated more on refractive surface 112. As the light exits through refractive surface 111 and refractive surface 112 the light is again disbursed by being refracted away from an axis running perpendicular to the air/plastic interface. This effect, in conjunction with the texture of refractive surfaces 111 and 112 produces a wide intense band of light across refractive surface 111 and refractive surface 112.

Figure 14:
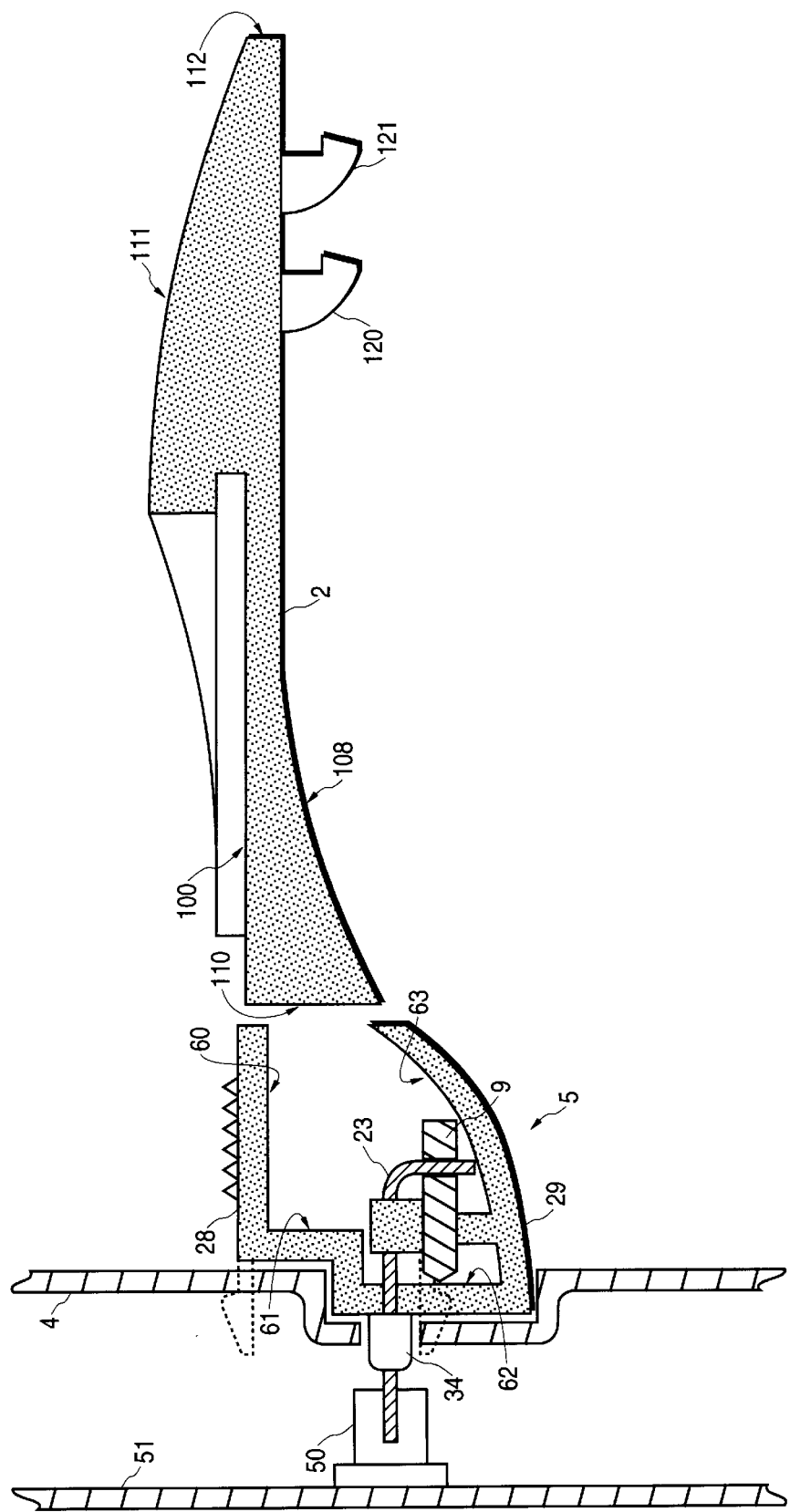
FIG. 14 is a cross sectional view along axis A—A of FIG. 1 in accordance with the present invention.

FIG. 14 shows a cross section along axis A—A of FIG. 1. Circuit board 51 located within chassis 4 is attached to socket 50 which receives pin 23. Insulator 34 surrounds pin 23 so as to insulate pin 23 so that there is no electrical contact between pin 23 and chassis 4. Pin 23 in conjunction with pins 20–22 (not shown) supplies power to printed circuit board 9.

Figure 15:
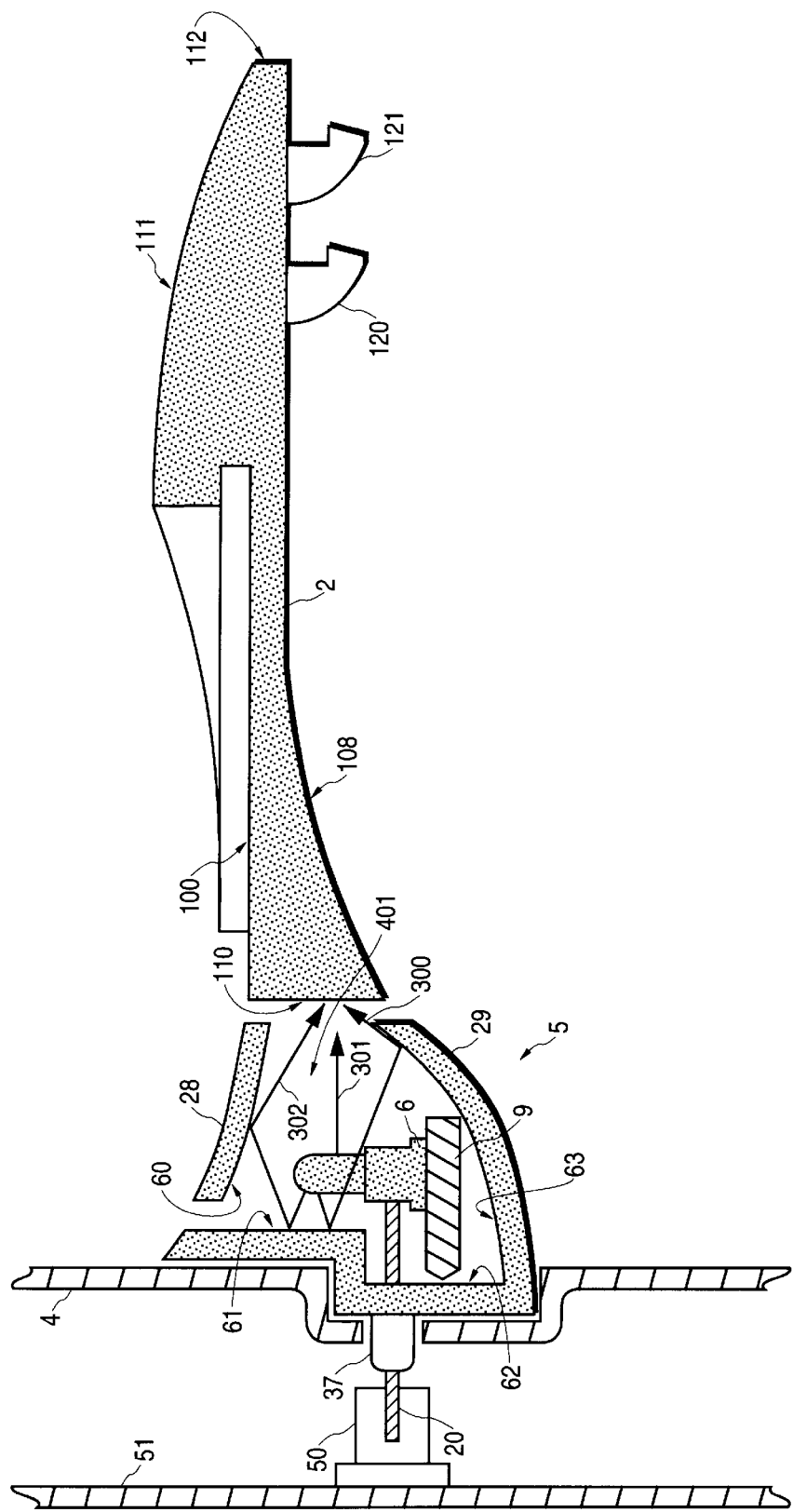
FIG. 15 is a cross sectional view along axis B—B of FIG. 1 in accordance with the present invention.

FIG. 15 is a cross section along axis B—B of FIG. 1. Light emanating from lamp 6 reflects off of reflective surfaces 60–63 of reflector assembly 5 through opening 401 and strikes refractive surface 110 of light bar 2. The reflection of light from reflective surfaces 60–63 gives a controlled and relatively uniform light across opening 401. Arrows 300–302 illustrate some possible light paths within reflector assembly 5. As the light strikes refractive surface 110, the light is dispersed as a result of the angles of incidence resulting from the texture of refractive surface 110. The light is disbursed along the length of the light bar, yet channeled by its converging height by reflective surfaces 100–108 so as to further disperse the light along the width of light bar 2 and focus the light along the height of light bar 2 so as to produce a strong band of visible light across refractive surface 112 and a less intense band of visible light across refractive surface 111.

Figure 16:
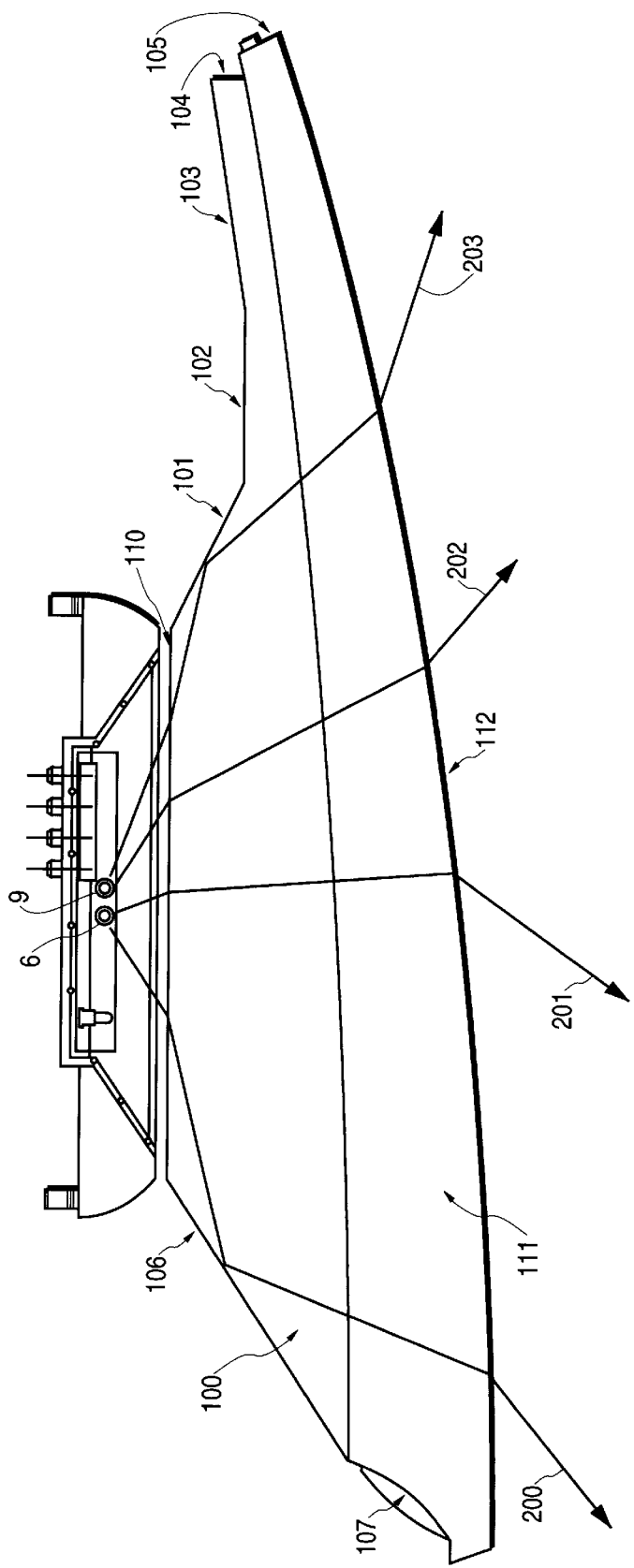
FIG. 16 is a top cut away view showing a reflector assembly and light bar in accordance with the present invention.

FIG. 16 illustrates a schematic view of representative light rays reflected from reflector assembly 5. Lines 200–203 illustrate examples of some possible light paths, which produce visible light as the light exits light bar 2 through refractive surface 111 and refractive surface 112. It can be seen that a concentrated band of visible light would be produced over refractive surfaces 111–112 which would taper off towards each end of light bar 2. Thus, a highly visible condition indication is visible to the user that tapers off towards each end of light bar 2.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A condition indicator for a computing device including:
   a reflector assembly attached to a computing device including a plurality of reflective surfaces;
   a printed circuit board disposed within said reflector assembly and electrically connected to said computing device;
   a light source connected to said printed circuit board and disposed within said reflector assembly such that light produced by said light source is reflected off of said plurality of reflective surfaces; and
   a light bar attached to said computing device including a first refractive surface and a second refractive surface and a plurality of reflective surfaces, said first refractive surface disposed adjacent to said reflector assembly such that said light emitted by said light source passes into said light bar and is dispersed by said first refractive surface such that said light reflects off of said reflective surfaces of said light bar so as to channel said light to said second refractive surface such that said light is transmitted out of said light bar so as to create a first visible band of light along said second refractive surface.

2. The condition indicator for a computing device of claim 1 further comprising: a colored light source connected to said printed circuit board and disposed within said reflector assembly, said colored light source producing colored light such that said colored light is reflected by said plurality of reflective surfaces of said reflector assembly so as to transmit said colored light to said light bar such that said colored light is dispersed by said first refractive surface and is reflected off of said reflective surfaces of said light bar so as to channel said colored light to said second refractive surface such that said colored light is transmitted out of said light bar so as to create a second visible band of light along said second refractive surface.

3. The condition indicator for a computing device of claim 2 wherein said light source comprises two incandescent light bulbs.

4. The condition indicator for a computing device of claim 2 wherein said colored light source comprises a light emitting diode that emits red light such that said second visible band of light has a red color.

5. The condition indicator for a computing device of claim 2 wherein said reflector assembly comprises plastic.

6. The condition indicator for a computing device of claim 5 wherein said light bar comprises transparent plastic.

7. The condition indicator for a computing device of claim 6 wherein said reflective surfaces of said reflector assembly reflects said light through an opening in said reflector assembly, said first refractive surface having a length at least as long as the length of said opening in said reflector assembly and having a width at least as wide as the width of said opening in said reflector assembly such that substantially all light reflected by said reflector assembly enters said light bar through said first refractive surface.

8. The condition indicator for a computing device of claim 7 wherein said light bar has a third refractive surface directly adjoining said second refractive surface and wherein said light from said light source and said colored light exit said light bar through said second refractive surface and through said third refractive surface so as to create a visible band of white light and a visible band of colored light across said second reflective surface and said third refractive surface.

9. A computing device having a condition indicator comprising:
 a chassis;
 a data processing device disposed within said chassis for performing computing functions;
 a data storage device disposed within said chassis and connected to said data processing device for storing data;
 a housing disposed around said chassis;
 a data bus coupled to said data processing device for coupling input and output between said data processing device and other devices;
 a reflector assembly connected to said chassis and electrically connected to said data processing device, said reflector assembly including a first light source and a second light source and a plurality of reflective surfaces such that said first light source and said second light source may be selectively engaged so as to emit light from said reflector assembly; and
 a light bar attached to said housing having a first refractive surface and a second refractive surface and a plurality of reflective surfaces, said light bar disposed within said housing such that said first refractive surface is disposed adjacent to said reflector assembly such that light from said reflector assembly passes through said first refractive surface and is reflected by said plurality of reflective surfaces such that said light strikes said second refractive surface so as to produce a visible band of light across said second refractive surface.

10. The computing device having a condition indicator of claim 9 wherein said first light source emits white light and wherein said second light source emits colored light.

11. The computing device having a condition indicator of claim 10 wherein said first light source comprises an incandescent lamp.

12. The computing device having a condition indicator of claim 10 wherein said first light source comprises two incandescent lamps, said incandescent lamps emitting white light so as to produce a visible band of white light across said second refractive surface.

13. The computing device having a condition indicator of claim 12 wherein said second light source comprises a light emitting diode that emits colored light.

14. The computing device having a condition indicator of claim 13 wherein said light emitting diode emits light having a red color such that, upon the application of power to said light emitting diode, red colored light is reflected into said first refractive surface and is reflected by said reflective surfaces of said light bar so as to exit said light bar through said second refractive surface so as to produce a visible band of red light across said second refractive surface.

15. The computing device having a condition indicator of claim 14 wherein said reflector assembly comprises plastic and wherein said light bar comprises plastic.

16. The computing device having a condition indicator of claim 15 wherein said light bar further comprises a third refractive surface disposed adjoining said second refractive surface such that light from said first light source and said second light source exit said light bar from said second refractive surface and said third refractive surface so as to selectively produce a band of visible white light and a band of visible red light across said second refractive surface and said third refractive surface.

17. The computing device having a condition indicator of claim 16 wherein said reflector assembly has a opening having a length of approximately 3.22 inches and wherein said visible band of light produced by said first light source produces a visible band of light having a length of greater than eight inches.

18. A computing device including:
 a chassis;
 a data processing device disposed within said chassis for performing data processing functions;
 a data storage device coupled to said data processing device for storing data;
 a data bus coupled to said data processing device for coupling input and output between said data processing device and other devices;
 a housing disposed around said chassis;
 a first light source attached to said chassis and coupled to said data processing device such that said first light source may be engaged so as to produce light so as to indicate a condition;
 a second light source attached to said chassis and coupled to said data processing device such that said second light source may be engaged so as to produce light so as to indicate a second condition;
 a reflector assembly including a plurality of reflective surfaces for reflecting light from said first light source and said second light source through an opening in said reflector assembly; and
 a light bar attached to said housing and having a first textured surface and a second textured surface and a third textured surface, said light bar having a plurality of reflective surfaces, said light bar attached to said housing such that said first textured surface is adjacent to said reflector assembly such that said light emitted by said first light source and said second light source enter said light bar through said first textured surface and are reflected by said plurality of reflective surfaces so as to exit said light bar through said second textured surface and said third textured surface, said first textured surface and said second textured surface and said third textured surface having ridges formed therein so as to refract light passing therethrough such that said light emitted by said first light source produces a first band of visible light across said second textured surface and said third textured surfaces so as to indicate said first condition and such that said light emitted by said second light source emits a second band of visible light across said second textured surface and said third textured surface so as to indicate said second condition.

19. The computing device of claim 18 wherein said second light source is a light emitting diode that emits red light such that said second band of visible light has a red color.

20. The computing device of claim 19 wherein said reflector assembly has a top enclosure including four attachment snaps and four finger grips, each of said finger grips disposed adjacent to one of said attachment snaps so as to easily attach and detach said reflector assembly from said chassis.

* * * * *